(12) United States Patent
Hüttinger

(10) Patent No.: US 7,100,442 B1
(45) Date of Patent: Sep. 5, 2006

(54) TRANSMITTER FOR LEVEL IN A FUEL TANK OF A MOTOR VEHICLE

(75) Inventor: Roland Hüttinger, Bieswang (DE)

(73) Assignee: Alfmeier Prazision Ag. Baugruppen und Systemlosungen, (DE)

( * ) Notice: Subject to any disclaimer, the term of this patent is extended or adjusted under 35 U.S.C. 154(b) by 399 days.

(21) Appl. No.: 09/679,425

(22) Filed: Oct. 4, 2000

(30) Foreign Application Priority Data

Oct. 8, 1999 (DE) ............................ 299 17 759 U

(51) Int. Cl.
*G01F 23/36* (2006.01)

(52) U.S. Cl. .......................................... 73/317

(58) Field of Classification Search .............. 73/304 R, 73/313; 338/90; G01F 23/36
See application file for complete search history.

(56) References Cited

U.S. PATENT DOCUMENTS

| | | | |
|---|---|---|---|
| 2,632,831 A * | 3/1953 | Pritkin et al. ................ | 338/140 |
| 3,102,990 A * | 9/1963 | Miller et al. ................. | 338/162 |
| 4,318,075 A * | 3/1982 | Pudelko et al. .............. | 338/162 |
| 4,931,764 A * | 6/1990 | Gaston ......................... | 338/185 |
| 5,051,719 A * | 9/1991 | Gaston et al. ............... | 338/162 |
| 5,554,965 A * | 9/1996 | Sundberg ..................... | 338/160 |
| 5,746,088 A * | 5/1998 | Sawert et al. ................. | 73/317 |
| 6,045,766 A * | 4/2000 | Moser ..................... | 423/240 R |
| 6,127,916 A * | 10/2000 | Cooper et al. .............. | 338/190 |
| 6,210,821 B1 * | 4/2001 | Lesieur et al. ................ | 429/17 |

FOREIGN PATENT DOCUMENTS

EP 0360444 A1 3/1990

\* cited by examiner

*Primary Examiner*—Hezron Williams
*Assistant Examiner*—Paul M. West
(74) *Attorney, Agent, or Firm*—Dority & Manning, P.A.

(57) ABSTRACT

A thick-film resistance 9 with a conductive path 8 of electrically conductive material is provided in the case of a fuel level transmitter for a fuel tank of a motor vehicle. The conductive path 8 is contacted in a sliding manner by a contact element. The material of the contact element exhibits a silver content, which has been reduced in such a manner, that an increase in the resistance of the contact ascribable to the formation of silver compounds, especially silver sulfide, silver sulfite and silver sulfate on the contacting surfaces is negligible.

16 Claims, 1 Drawing Sheet

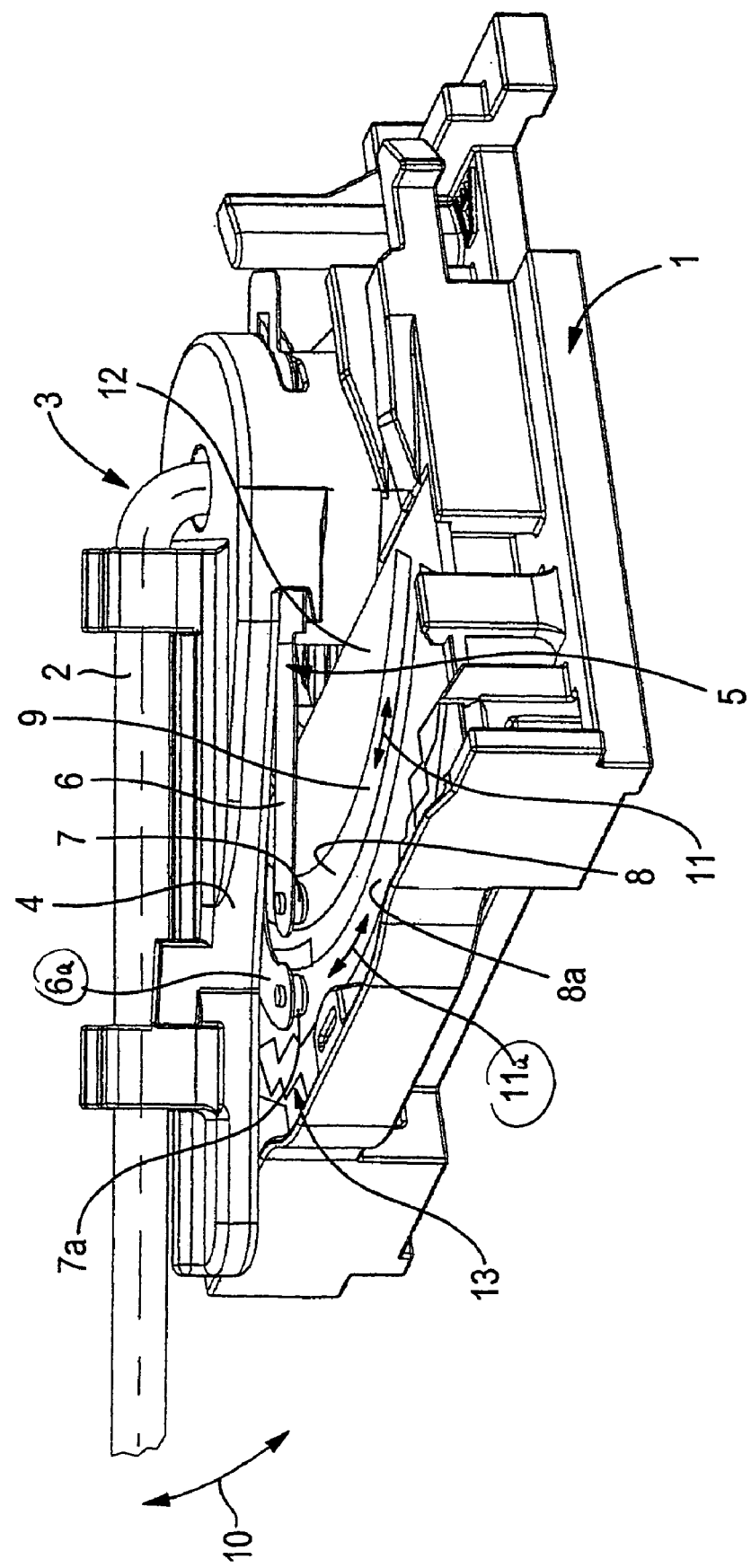

TRANSMITTER FOR LEVEL IN A FUEL TANK OF A MOTOR VEHICLE

FIELD OF THE INVENTION

The invention concerns a level transmitter for the fuel tank of a motor vehicle.

BACKGROUND OF THE INVENTION

Level transmitters, as a rule, exhibit an arm for signal transmission, on one end of which a float is placed, while the other end is pivotally secured to a carrier which in turn is anchored to base. Present on this secured end is a rivet contact element, which by at least one contact rivet, stands electrically in slide-contact with an arc shaped conductor path on a thick-film resistance. The conductive path is subdivided into individual stages aligned concentrically toward the center of curvature of the arc. Each stage is electrically connected to a resistance path. In accordance with the angular position, that is, as to the placement of the arm on the arc, the contact finds itself on another stage and thereby at another position on the resistance path, thus exposing the circuit to differing values of resistance. By point by point calibration, the values of resistance are converted to values of the content of the vehicle tank.

The thick-film resistance for the transmission device has a carrier, which is, for instance, made of ceramic material, upon which is imprinted a resistance path and at least one of the arc-like conductive paths contacted by the contact rivet. The conductive paths are constructed of an electrically conductive material.

EP 78 92 31 A2 discloses a tank content transmitter, in which two conductive paths of a thick-film resistance are provided to be contacted by contact fingers. In this case, the fingers are of a material composed of 38 wt % silver, in addition to palladium, platinum and copper.

In recent times, such fuel level transmitters have been, in part, subject to signal transmission error and even total failure, after a short operational life. In failure, the level transmitters deliver no electrical signal. These disturbances occur when the level transmitters are applied in fuel tanks made of fluoridized polyethylene and/or when desulfurized fuels are used.

BRIEF SUMMARY OF THE INVENTION

The invention proposes a fuel level transmitter, which operates without disturbance. This is achieved by a contacting material chosen for the contact element in which the silver content is so reduced that the increase of resistance of the contact surfaces attributable to the buildup of silver salts on the surfaces is negligible.

The invention is based on the observations and information as outlined below:

Polyethylene tanks were treated with fluorine gas in order to make them impermeable to fuel vapors. After the fluorine treatment, the tank was purged with air to drive out superfluous fluorine gas. Conventional fuel level transmitters, equipped with contact rivets which contain about 80 wt % silver, the remaining metal being nickel, were placed in such tanks. The tank was filled with ordinary fuel. The degree of filling was continually alternated with the aid of pumps between high and low limiting values. As this was done at specified time intervals, the characteristic resistance curves were marked off and compared with the characteristic resistance curves of the fuel level transmitter in its unused state.

These trials were carried out for a period of several weeks. After a few days, a significant increase in the resistance between the contact element and the conducting line became evident. As the duration of the tests continued, an additional increase of the resistance was observed. This was continued up to a point of total failure, i.e., the fuel level transmitter ceased to deliver any electrical signal.

By analysis, the determination was made that the observed disturbances can be ascribed to non-conductive compounds of silver forming on the surface of the contact rivet, these compounds being principally silver sulfide, i.e. $Ag_2S$.

These results gave rise to the conclusion that the transformation of the silver is due to the release of fluorine and hydrofluoric acid from the polyethylene of the tank. These materials are strong oxidizers and oxidize, for instance, the silver contained in the contact rivets. This oxidation can take place in the time period between the mounting of the fuel level transmitter and the time at which a vehicle is put into operation. Such oxidation may also be furthered by humidity of the ambient air. When fuel is present, through a chain of reactions, which need not be amplified here, silver sulfide forms, conceivably along with other silver compounds, notably sulfites or sulfates. These compounds increase the resistivity of the contacting surfaces. Similar effects can also affect the silver content of the conductive path on the thick-film resistance. Further tests have shown that the silver compounds are also disseminated by abrasion of the conducting path, whereby the disturbances are exacerbated.

Comparable tests were also carried out with non-fluoridated tanks in which fuel desulfurized by hydrogen was employed. In these cases, also after a few weeks, the described disturbances and functional failure were again observed. By analysis of the surface materials of the contact rivets, the known formation of the silver compounds became evident. The reason in this case seems to lie with the hydrogen based desulfurization of the fuel. Apparently, in spite of the purging of the hydrogen sulfide, traces thereof remained still dissolved in the fuel, which led to the observed changes in the contact rivets. The use of desulfurized fuel in fluoridized polyethylene tanks seems particularly laden with problems.

A fuel level transmitter in accord with the invention can now be applied under the given conditions without fearing a disturbance in precision at the fuel gauge or a total failure of the transmitter. Advantageously, a contact material is employed in which silver is not present at all, or only present in the smallest possible traces or contamination. The smallest quantity of silver can lead, likewise, to the recited disturbances. The quantity of such traces, however, is seen as negligible within the expected life of a motor vehicle. By the use of silver-free contact rivets, an estimation of the tolerable maximum quantity of silver in relation to an optional operational life of a motor vehicle becomes superfluous.

In one aspect of the invention, the metal used for the contact element in the fuel level transmitter is based on gold. Gold forms none of the compounds which increase resistance when subjected to the above aggressive conditions either in a fluoridized polyethylene tank and/or in desulfurized fuel. More specifically, a gold-nickel alloy is employed. The presence of nickel in the alloy of the contact rivet increases resistance to abrasion. Advantageously, an alloy is employed which contains 94 to 98 wt % gold and the remainder is nickel. An alloy of 96 wt % gold and 4 wt % nickel has also shown itself as particularly serviceable.

In the case of another fuel level transmitter, a contact rivet made on a platinum basis has been made. Platinum is inherently so abrasion resistant that other additives to combat abrasion can be dispensed with. On this account, in this embodiment of the invention, a contact rivet of platinum is used.

BRIEF DESCRIPTION OF THE DRAWING

The invention will be further explained and described with the aid of the accompanying drawing which presents one embodiment of a fuel level transmitter.

DETAILED DESCRIPTION OF THE INVENTION

Detailed reference will now be made to the drawing in which an example embodying the present invention is shown. The drawing and detailed description provide a full and detailed written description of the invention, and of the manner and process of making and using it, so as to enable one skilled in the pertinent art to make and use it, as well as the best mode of carrying out the invention. However, the examples set forth in the drawing and detailed description are provided by way of explanation only and are not meant as limitations of the invention. The present invention thus includes any modifications and variations of the following examples as come within the scope of the appended claims and their equivalents.

The illustration shows a fuel level transmitter with an essentially plate shaped basic body 1 made of a plastic material and affixed to a transmitting arm 2. On the free end of the arm 2 is affixed (not shown) a float. The other end 3 of the transmitting arm 2 is secured to a carrier 4, which is pivotally affixed to the basic body 1. On the underside of carrier 4 is placed a contact spring 5, which pivots on the same axis as the carrier 4. The contact spring 5 possesses, on the underside of the carrier 4, two contact tongues 6, 6a, which respectively carry on their free ends contact rivets 7 and 7a. These contact rivets 7, 7a stand, respectively, in electrical communication with the conducting paths 8, 8a, which are designed as circular arcs and placed on ceramic carrier plate 12 of a thick-film resistance 9. The conductive paths 8, 8a contain at least one noble metal, preferably gold or platinum. Silver is avoided. The contact rivets are composed of a gold-nickel alloy of 96 wt % gold and 4 wt % nickel. In operation, upon changing fuel levels, the transmitter arm 2 swings back and forth in the directions of the double arrow 10. In like manner, the contact rivets 7, 7a execute a movement on the conductive paths 8, 8a in a direction of double arrows 11, 11a respectively.

The conductive path 8a is subdivided into a plurality of laterally spaced, individual stages (not shown) aligned toward the center of curvature of the circular arc. These stages electrically communicate with a resistance path 13 underneath the conduction path 8a. The contact rivet 7a accepts from the conductive path 8a, that is, from the resistance train, a potential from one of the angular settings of the transmission arm 2, which potential is then taken off by the contact rivet 7 and the conductive path 8.

It will be apparent to those skilled in the art that various modifications and variations can be made in the present invention without departing from the scope and spirit of the invention. For example, specific shapes of elements on the illustrated embodiment may be altered to suit particular vehicles or other environments and applications, such as marine applications. Accordingly, the invention is not limited to use only on vehicles as described herein. Thus, it is intended that the present invention include any and all modifications and variations as come within the scope of the appended claims and their equivalents.

The invention claimed is:

1. A fuel level transmitter for a fuel tank defining a thick-film resistance with a conductivity path of electrically conductive material, the fuel level transmitter comprising a silver-free, gold-based contact element operably disposed in a desulfurized fuel and configured to slidingly contact the conductivity path, the silver-free, gold-based contact element being configured to reduce the resistance between the conductivity path and the contact element by impeding a build-up of non-conductive silver compounds on the contact element.

2. The fuel level transmitter as in claim 1, wherein the contact element is a gold-nickel alloy.

3. The fuel level transmitter as in claim 2, wherein the contact element is between 94 to about 98 wt % gold.

4. The fuel level transmitter as in claim 3, wherein the contact element is 96 wt % gold.

5. The fuel level transmitter as in claim 1, wherein the contact element is a contact rivet attached to a spring element, the spring element defining a spring constant urging the contact rivet in a direction of the conductivity path.

6. The fuel level transmitter as in claim 1, wherein the fuel tank is a fluoridized polyethylene tank.

7. A fuel level transmitter for a fuel tank, the fuel level transmitter defining a thick-film resistance with a conductivity path of electrically conductive material, the fuel level transmitter having a silver-free, platinum-based contact element operably disposed in a desulfurized fuel and configured to slidingly contact the conductivity path, the silver-free, platinum-based contact element being configured to reduce the resistance between the conductivity path and the contact element by impeding a build-up of non-conductive silver compounds on the contact element.

8. The fuel level transmitter as in claim 7, wherein the contact element is a contact rivet disposed on a spring element, the spring element having a spring constant urging the contact rivet in a direction of the conductivity path.

9. The fuel level transmitter as in claim 7, wherein the fuel tank is a fluoridized polyethylene tank.

10. The fuel level transmitter as in claim 7, wherein the contact element consists of platinum.

11. A method of using a fuel level transmitter, the method comprising the steps of:
  a) providing a fluoridized polyethylene fuel tank;
  b) providing the fuel level transmitter having a thick-film resistance with an electrically conductive path and a contact element, each of the conductive path and the contact element being made from one of a silver-free-gold-based material, a silver-free-platinum-based material, or a silver-free-platinum material, the contact element configured to slidingly contact the conductive path; and
  c) operably disposing the contact element in a fuel, the silver-free conductive path and the silver-free contact element being configured to reduce the resistance between the conductive path and the contact element by impeding a build-up of non-conductive silver compounds on the contact element.

12. The method as in claim 11, further comprising the steps of providing a spring element with a spring constant and attaching the contact element to the spring element to urge the contact element in a direction of the conductivity path via the spring constant.

13. The method as in claim 11, wherein the fuel is desulfurized fuel.

14. A method of using a fuel level transmitter, the method comprising the steps of:
   a) providing a fuel tank;
   b) providing the fuel level transmitter having a thick-film resistance with an electrically conductive path and a contact element, each of the conductive path and the contact element being made from a silver-free-gold-based material, a silver-free-platinum-based material, or a silver-free-platinum material, the contact element configured to slidingly contact the conductivity path;
   c) operably disposing the contact element and the conductive path in a desulfurized fuel; and
   d) reducing the resistance between the conductive path and the contact element by impeding a build-up of non-conductive silver compounds on the contact element.

15. A fuel level transmitter for a fuel tank defining a thick-film resistance with a conductivity path of electrically conductive material, the fuel level transmitter comprising:
   a silver-free conductivity path; and
   a silver-free contact element operably disposed in a fluoridized polyethylene fuel tank and configured to slidingly contact the conductivity path, the silver-free conductivity path and the silver-free contact element being configured to reduce the resistance between the conductive path and the contact element by impeding a build-up of non-conductive silver compounds on the contact element, wherein each of the silver-free conductivity path and the silver-free contact element is made from a silver-free, gold-based material and configured for immersion in a desulfurized fuel.

16. A fuel level transmitter for a fuel tank defining a thick-film resistance with a conductivity path of electrically conductive material, the fuel level transmitter comprising:
   a silver-free conductivity path; and
   a silver-free contact element operably disposed in a fluoridized polyethylene fuel tank and configured to slidingly contact the conductivity path, the silver-free conductivity path and the silver-free contact element being configured to reduce the resistance between the conductive path and the contact element by impeding a build-up of non-conductive silver compounds on the contact element, wherein each of the silver-free conductivity path and the silver-free contact element is made from a silver-free, gold-nickel alloy and configured for immersion in a desulfurized fuel.

* * * * *

UNITED STATES PATENT AND TRADEMARK OFFICE
CERTIFICATE OF CORRECTION

PATENT NO. : 7,100,442 B1
APPLICATION NO. : 09/679425
DATED : September 5, 2006
INVENTOR(S) : Andreas Mendler and Jachin Schwalbe It is certified that error appears in the above-identified patent and that said Letters Patent is hereby corrected as shown below:

On Title Page
ITEM (75) Inventors:

"Roland Huttinger, Bieswang (DE)" should read:
-- Andreas Mendler, Leonberg (DE) and Jachin Schwalbe, Brauschweig (DE) --

Signed and Sealed this

Nineteenth Day of December, 2006

JON W. DUDAS
*Director of the United States Patent and Trademark Office*